United States Patent Office 2,777,837
Patented Jan. 15, 1957

2,777,837

OLEORESINOUS ROSINAMINE CONDENSATIONS

Maynard B. Unger, Chicago, Ill., assignor to The Sherwin-Williams Company, Cleveland, Ohio, a corporation of Ohio No Drawing. Application October 14, 1952,
Serial No. 314,751

12 Claims. (Cl. 260—102)

This invention relates to oleoresinous condensation products having siccative characteristics which comprise the reaction products of unsaturated fatty acids of sixteen or more carbon atoms with rosinamine.

More specifically, this invention relates to siccative products useful as varnishes of themselves and as varnish intermediates formed by condensing a primary rosinamine with a drying or semi-drying oil fatty acid and acidic condensations of drying oil fatty acids. This application is a continuation-in-part of my parent application filed May 20, 1952, as U. S. Serial No. 289,016, now abandoned.

Heretofore it has been deemed practically essential that drying oil fatty acids had to be in chemical combination with at least a trifunctional compound in order to obtain substances capable of drying in the presence of paint driers to form solid films. For example, it is well known that glycerides of linseed fatty acids will dry to form solid films, but that glycol dilinoleate, for example, will not dry. The latter product remains as tacky as fly paper for very long periods of time when exposed to the air in thin films. As will be shown in the examples which follow, abietyl alcohol which is of the same general molecular size, will when condensed with fatty acids of unsaturated drying oils fail to dry to a tack-free state even after several weeks of exposure when admixed with driers and spread out in a thin film. However, upon testing a similar rosinamine drying oil fatty acid condensate in direct comparison with the abietyl alcohol ester, the former became tack-free in 6 hours and had through dried in about 36 hours while the latter did not dry even after several weeks of exposure to the air. It is unexpected to find that a mono fatty acid condensation product will dry, and particularly so, when a nitrogen-containing compound is a part of the reaction product. It is quite general that nitrogen-containing compounds act as drying inhibitors.

It is, therefore, the broad object of this invention to provide a novel class of siccative materials which comprise the condensation products of drying oil fatty acids of at least sixteen carbon atoms with a class of materials generically labeled as rosinamines.

More particularly, it is the object of this invention to provide a useful intermediate in the modification of oleoresinous varnishes which comprises the amide of rosinamine and an unsaturated fatty acid of the class obtained upon hydrolysis of a triglyceride oil having an iodine value of at least 120.

It is another object of this invention to provide a method for the manufacture of a short oil oleoresinous varnish which comprises condensing one mol of a primary rosinamine with at least one mol but not more than 10% in excess thereof of an unsaturated acid of at least sixteen carbon atoms and a minimum iodine value of at least 120 at a temperature above 300 degrees F. to form the amide of the said reactants.

Other and related objects will become apparent from what follows.

By the generic term "rosinamine" as used herein, it is intended to refer to commercially available products which contain from about 85% to 97% or more of the amino compound derived from rosin. This group of compounds includes rosinamine, dehydrorosinamine, dihydrorosinamine and tetrahydrorosinamine.

The non-substituted primary rosinamines to which this invention is specifically directed are characterized by an organic residue having a structure similar to the structure of the organic residue of abietic acid with an amino group substituted for the carboxyl group of abietic acid. Stated more technically, such compounds also may be referred to as the amino-methyl isopropyl derivatives of phenanthrene having various degrees of unsaturation.

Included in the drying oil fatty acids useful in and for the purposes of the invention are the hydrolysis products of the triglycerides from both animal and vegetable sources containing at least sixteen carbon atoms and an iodine value of 120. Also included within the scope of the useful fatty acids are those of conjugated nature which include tung or China-wood oil fatty acids and dehydrated castor oil fatty acids (specifically oleostearic acid). Oiticica oil fatty acids (licanic acids) are also included within the term "conjugated fatty acids." Generic fatty acid mixtures useful are those of linseed oil, soya bean oil, safflower oil, sunflower oil, perilla oil, etc., and the marine oils. More specifically, the fatty acids obtained from these oils upon hydrolysis and separation may be used. These include oleic, linoleic and linolenic as the principal unsaturated fatty acids, although the fish oil fatty acids contain a larger number of carbon atoms than those named.

The above-described fatty acids may be further condensed with aromatic and aliphatic vinyl compounds, maleic anhydride, etc., without interfering with the fatty acid carboxyl group which is, of course, essential to the condensates of interest for the purposes of this invention. Products of this latter category are too brittle in general for direct use and it is preferred to use them as further modifiers of standard paint and varnish vehicle coatings. Products of this invention may be used to replace gloss oil (a solvent solution of rosin) to upgrade the quality of the prior coating composition.

In a series of experiments with rosinamine and a variety of acids including those of monobasic and dibasic character, it was observed that rosinamine behaved ambiguously in respect to its acid neutralizing equivalence. In the case of monocarboxylic fatty acids of the class here of interest, an attempt was made to determine the acid neutralizing equivalence by reacting two mols of soya bean oil fatty acids with one mol of rosinamine. Slightly more (about 10%) than one equivalent of water was given off. Repeated checks with various other drying oil fatty acids showed rosinamine to have an acid neutralizing equivalent of one (plus) but not two. However, upon checking the potential reactivity with phthalic anhydride and other representative dicarboxylic acids including maleic, adipic, diglycollic, etc., the acid neutralizing equivalents were found to be two.

The anomalous behavior of rosinamine with drying oil fatty acids is not understood. For example, when slightly more (e. g., 5%–10%) than one mol of linseed oil fatty acids are reacted below about 250 degrees F. with one mol of rosinamine, the initial reaction product is assumed to be a simple salt containing only one linseed fatty acid radical. Upon heating vigorously to above 300 degrees F., the salt is believed to break down by liberation of water to form the amide. As observed earlier, the drying oil amide exhibits unexplained behavior in its drying quality which opens a field for the use of the unsaturated fatty acid rosinamide in film-forming coating compositions.

The previous assumptions as to the functional nature of rosinamine is a useful tool for practical purposes, but does not explain the nature of the product obtained nor the fact that some amount in excess of one mol of neutralizing equivalency is obtained from one mol of rosinamine reacted with drying oil fatty acids.

The following examples are illustrative of the best known method of accomplishing the objects of my invention and are meant to be illustrative but not to be construed as exhaustive.

*Example 1*

1120 parts of linseed fatty acids and
1248 parts rosinamine were heated together in a vessel equipped with reflux condenser, stirrer and inert gas delivery tube under an inert gas blanket at about 450 degrees F. for an hour and the temperature allowed to increase to about 600 degrees F. over an additional period of about five hours. The resultant product was reduced to 90% solids with mineral spirits. The resin had a Parr bar melting point of 130 degrees F., an acid value of 2 and a color of 14 Gardner.

*Example 2*

Into a similar vessel to that of Example 1 were placed 1675 parts soya fatty acids
1860 parts rosinamine
100 parts toluene The additives were brought to a temperature of reflux of 450 degrees F. for 9 hours and the excess toluene, used to remove the water of reaction, distilled off. The resultant product was cut to 80% solids with mineral spirits. The vehicle had a viscosity of V (Gardner-Holdt).

*Example 3*

840 parts China-wood oil fatty acids
936 parts rosinamine
100 parts toluene were brought to reflux in a glass reaction vessel at 345 degrees F. for two hours. The temperature was then increased to 440 degrees F. for about one hour and then to 510 degrees F. for a similar time. The acid value was 11.2 and the melting point 120 degrees F. (Parr Bar).

*Example 4*

280 parts China-wood oil fatty acids
98 parts maleic anhydride
50 parts toluene were refluxed at about 365 degrees F. for about one hour in equipment as described in Example 1. An additional 560 parts China-wood oil acids were added along with 1560 parts rosinamine and the temperature brought back to 500 degrees F. and held for about two hours. The acid value was 2.1 and the product had a melting point of 140 degrees F. (Parr).

*Example 5*

This example is illustrative of an oleoresinous varnish made with, and in the same cook, as the rosinamine-fatty acid condensate.

In equipment similar to that of Example 1 were placed 890 parts soya bean oil fatty acids
1080 parts rosinamine
675 parts alkali refined soya bean oil The above ingredients were heated together under agitation to a temperature of from 450 to 500 degrees F. and held for about 9 hours to an acid value of 5. The varnish was reduced to 80% solids with mineral spirits. The viscosity of the reduced product was X.

The viscosity of the oleoresin may be increased, as is well known in the art, by cooking the product additional periods of time at a temperature between 550 and 600 degrees F.

*Example 6*

900 parts of a dimerized linseed oil fatty acid made in accordance with the process described by Goebel in U. S. Patent 2,482,761 and 945 parts of rosinamine
100 parts xylol were heated in a glass reflux vessel to a temperature of 360 degrees F. and held for 30 minutes. Thereafter the temperature was increased to 440 degrees F. for one hour. The acid value of the product was 7 and the melting point of the resin 135 degrees F. (Parr Bar). The resultant product dried to a hard film upon admixture with metallic paint driers and was found useful in modifying (e. g. "shortening") the physical characteristics of other varnishes by cold-blending with them.

*Example 7*

624 parts rosinamine
560 parts linseed fatty acids were weighed into a 3 neck glass flask equipped with thermometer, agitator and Dean-Stark tube and condenser. The temperature in the flask was increased to 380 degrees F. and held for two hours. Thereafter the temperature was taken to 460 degrees F. and held for an acid value of 5. Thirty-two parts of water were collected from the Dean-Stark moisture tube. The product was reduced to 65% solids with mineral spirits and 0.5% of lead as lead naphthenate and 0.05% cobalt as cobalt naphthenate added on the basis of the solids. The film of the varnish so prepared dried to a tack-free condition in 6 hours and was through dry in about 36 hours.

*Example 8*

680 parts abietyl alcohol
560 parts linseed fatty acids were weighed into a 3 neck glass flask as in Example 7. The temperature of the batch was increased to 380 degrees F. and held for two hours. Thereafter the temperature was increased to 460 degrees F. and held for 10 hours. The acid value was then 6.0. The resultant product was reduced to 65% solids with mineral spirits and drier added as in Example 7.

A film of the same thickness as in Example 7 was laid down on glass in comparison with a similar film of the material of this example. A film of the product of the instant example was not drying at the end of 8 hours and was still tacky at the end of two weeks of exposure to the air.

*Example 9*

(a) Into a three neck glass flask fitted with agitator, thermometer, gas delivery tube, dropping funnel and condenser were weighed 1800 parts of dehydrated castor oil fatty acids. The temperature of the content of the flask was increased to 350 degrees F. and held for 5 hours while 1360 parts vinyl toluene and 16 parts of ditertiary butyl peroxide were added slowly or in increments. An inert gas blanket was maintained over the reactants. Thereafter the temperature of the copolymerizing mass was increased to 440 degrees F. and held for 4 hours. During the last three hours of the cook one part additional of the peroxide was added each half hour. The product had an acid number of 106.2, a viscosity of 5'27" (Gardner-Holdt tube), was clear and had a color of 8.

(b) 491 parts of the vinyl toluene-drying oil fatty acid copolymer of (a) were condensed with 290 parts of rosinamine by heating the components to a temperature of 520 to 525 degrees F. for about 6 hours or an acid value of 4.7. The condensation product was thereafter reduced to 75% solids with mineral spirits. The resulting varnish had a color of 11 and a viscosity of Z5 (Gardner-Holdt).

Upon admixing with the requisite driers, films of the product set-to-touch in 2 hours and 14 minutes, was Kraft paper free in an additional 10 minutes and was free to foil in 4 hours 27 minutes.

*Example 10*

(a) In similar equipment and by similar process to that described in Example 9(a) were reacted 2100 parts of dehydrated castor oil fatty acids and 900 parts styrene. 18 parts of ditertiary butyl peroxide were used as catalyst in the copolymerization reaction. The final product had an acid value of 137.3.

(b) 277 parts of the styrene-fatty acid condensate of Example 10(a) were reacted with 211 parts of rosinamine at a temperature of 520 to 525 degrees F. for approximately 3 hours or to an acid value of 3.8. The product was thinned to 70% solids with mineral spirits. The color of the varnish was 11 and the viscosity X (Gardner-Holdt).

Upon testing for drying when exposed in thin films in the presence of the usual paint driers, the films set-to-touch in 2 hours 40 minutes, to Kraft paper free in an additional 10 minutes and became foil free in 7 hours 50 minutes.

Having thus described and illustrated the invention, I claim:

1. The siccative substantially neutral amide of rosinamine and an unsaturated drying oil acid.
2. A siccative coating composition which comprises the substantially neutral amide of one mol of a non-substituted primary rosinamine with at least an equimolecular quantity of an unsaturated fatty acid of at least sixteen carbon atoms in length and a minimum iodine value of at least 120.
3. The siccative substantially neutral amide of rosinamine and linseed oil fatty acids.
4. The siccative substantially neutral amide of rosinamine and soya bean oil fatty acids.
5. The siccative substantially neutral amide of rosinamine and a conjugated drying oil fatty acid having at least sixteen carbon atoms.
6. The siccative substantially neutral amide of rosinamine and China-wood oil fatty acids.
7. The siccative substantially neutral amide of rosinamine and dehydrated castor oil fatty acids.
8. The monoamide of rosinamine and linoleic acid.
9. The monoamide of rosinamine and linolenic acid.
10. The monoamide of rosinamine and oleostearic acid.
11. A method of manufacture of a short oil oleoresinous varnish which comprises reacting one mol of rosinamine with at least one mol but not more than about 10% in excess thereof of an unsaturated fatty acid of at least sixteen carbon atoms and a minimum iodine value of at least 120 at a temperature above 300 degrees F. to form the amide of said acid and said amine.
12. A process for modifying the character of continuous dry film-forming coating compositions which comprises incorporating therein the substantially neutral amide of rosinamine and an unsaturated drying oil fatty acid.

References Cited in the file of this patent

UNITED STATES PATENTS

| | | |
|---|---|---|
| 1,954,433 | Thomas | Apr. 10, 1934 |
| 2,075,230 | Schatz | Mar. 30, 1937 |
| 2,484,010 | Bried | Oct. 11, 1949 |
| 2,590,571 | Putnam | Mar. 25, 1952 |